US012654906B2

(12) United States Patent
Perez-Aguayo

(10) Patent No.: US 12,654,906 B2
(45) **Date of Patent: *Jun. 16, 2026**

(54) FUNNEL-BOTTOM CONTAINER

(71) Applicant: Jesus Perez-Aguayo, Wichita, KS (US)

(72) Inventor: Jesus Perez-Aguayo, Wichita, KS (US)

(*) Notice: Subject to any disclaimer, the term of this patent is extended or adjusted under 35 U.S.C. 154(b) by 63 days.

This patent is subject to a terminal disclaimer.

(21) Appl. No.: 18/111,794

(22) Filed: Feb. 20, 2023

(65) Prior Publication Data

US 2023/0202714 A1 Jun. 29, 2023

Related U.S. Application Data

(63) Continuation-in-part of application No. 15/811,808, filed on Nov. 14, 2017, now Pat. No. 11,583,884.

(60) Provisional application No. 62/421,655, filed on Nov. 14, 2016.

(51) Int. Cl.

| | |
|---|---|
| ***B65D 25/02*** | (2006.01) |
| ***B05B 15/30*** | (2018.01) |
| ***B65D 25/48*** | (2006.01) |
| *B05C 17/03* | (2006.01) |

(52) U.S. Cl.

CPC .............. *B65D 25/02* (2013.01); *B05B 15/30* (2018.02); *B65D 25/48* (2013.01); *B05C 17/0333* (2013.01)

(58) Field of Classification Search

CPC ........ B65D 25/02; B65D 25/48; B05B 15/30; B05B 15/40; B05C 17/0333

See application file for complete search history.

(56) References Cited

U.S. PATENT DOCUMENTS 4,488,584 A * 12/1984 Hestehave ............. B65D 25/20 141/331
5,749,500 A * 5/1998 Kraus .................... B65D 25/02 222/464.7
7,407,063 B2 * 8/2008 Rockwell, III .......... B44D 3/12 220/608
D890,459 S * 7/2020 Fischer .......................... D32/54
11,420,793 B2 * 8/2022 Fischer .................. B65D 25/02
11,583,884 B2 * 2/2023 Perez-Aguayo ..... B67D 7/0277
2001/0004985 A1 * 6/2001 Pertschi .................... B05B 9/03 220/570
2008/0110904 A1 * 5/2008 Smith ...................... B65D 1/16 220/608
2011/0108580 A1 * 5/2011 Koh ........................ B05B 15/30 222/464.7
2013/0299506 A1 * 11/2013 Chavez .................... B65D 1/16 220/729
2014/0117027 A1 * 5/2014 Ulstad ...................... B65D 1/40 220/600
2021/0213481 A1 7/2021 Perez-Aguayo

OTHER PUBLICATIONS

"Final Office Action Received for U.S. Appl. No. 15/811,808, mailed on Oct. 8, 2021".
"Non- Final Action received for U.S. Appl. No. 15/811,808, Mailed on May 28, 2021."

(Continued)

*Primary Examiner* — Nicolas A Arnett
(74) *Attorney, Agent, or Firm* — Kutak Rock LLP

(57) ABSTRACT

A container is provided. The container includes a funnel shaped bottom to collect paint into a recess while a pump draws liquid from the container for application to a surface and/or within an area.

13 Claims, 6 Drawing Sheets

(56) References Cited

OTHER PUBLICATIONS

"Notice of Allowance received for U.S. Appl. No. 15/811,808, Mailed on Mar. 8, 2022."
"Notice of Allowance received for U.S. Appl. No. 15/811,808, Mailed on Sep. 14, 2022."
"Restriction Requirement Received for U.S. Appl. No. 15/811,808, mailed on May 14, 2021."

* cited by examiner

FUNNEL-BOTTOM CONTAINER

CROSS-REFERENCE TO RELATED APPLICATIONS

This is a continuation-in-part application of U.S. patent application Ser. No. 15/811,808, filed Nov. 14, 2017, and now U.S. Pat. No. 11,583,884 which claims priority pursuant to 35 U.S.C. 119(e) to U.S. Provisional Patent application Ser. No. 62/421,655, filed Nov. 14, 2016, the entire disclosures of which are incorporated herein by reference.

FIELD OF THE INVENTION

The present invention relates generally to paint buckets, containers, and vessels. More specifically, the present invention is concerned with a paint bucket, container, or vessel with a funnel-shaped bottom.

BACKGROUND

Liquids, gels, and the like, have been stored, transported, and dispensed, in a variety of containers and vessels throughout history. Historians believe that glass containers may have been developed in the early years before Christ and have been utilized ever since. Even prior to the discovery of glass, containers have been constructed from a variety of materials such as wood, clay, bamboo, etc. As such a widely used apparatus, the container has evolved over time and continues to be used as a primary mode of storing, transporting, dispensing, all types of material.

Equally evolved as the types of containers, is the mode and methods developed to remove their contents. Perhaps the most wildly used way to remove contents from a container is wherein the user tilts, or leans, the container, and the contents is poured out. However, some applications pouring is infeasible and a more sophisticated method is required.

One such application wherein an advanced method is required, is where the container or vessel utilizes a type of suction device to draw contents, or product, from the container or vessel. As such, conventional designs typically incorporate a straw or tube that is inserted on or near the containers bottom surface and the contents are removed by pumping, siphoning, vacuuming, or the like.

Another, application where pouring can be undesired is within the context of painting. While many homeowners paint their houses using manual brushes and/or rollers, manual painting is a time-consuming process. Commercial painters and many homeowners often prefer to use powered painting tools. Powered painting tools may draw paint from a bucket or other large container using a suction or vacuum system and then apply the paint to a surface using a sprayer, roller, or other application device. In such a fashion, a uniform flow of paint to a surface may be attained and the painter need not interrupt paint application to periodically apply paint to a brush or roller. By using a vacuum or suction system to draw paint from the container, considerable time, effort, and energy of the painter may be saved while often achieving a superior result.

SUMMARY

While, liquids, gels, or other materials, have been stored, transported, and dispensed, in a variety of containers and vessels for many years, the containers and vessels commonly used for such purposes do not provide a design or means that provides user's with a way to dispense all the contents within the container or vessel efficiently or effectively. Traditionally, conventional containers or vessels incorporate an ineffective design, specifically in the lower area, that does not allow the last remaining portion of the containers contents to be utilized. Without the user leaning or pouring the last remaining contents out of the container, the unused contents are usually discarded and results in unnecessary product waste.

Therefore, there is a need for an improved container or vessel design that incorporates a design, and/or system, that allows a user to efficiently and effectively withdraw all, or most, of the containers or vessel's contents. Specifically, there is a need for an improved funnel-bottom paint bucket and a funnel-bottom container.

While powered painting systems save considerable labor relative to manual painting while producing superior results, the use of powered painting systems is not without challenges. One particular challenge to using an automated painting system is that the final portions of paint within a container may be difficult to withdraw using the vacuum system. As the paint level within a bucket or other container lowers, the intake nozzle of the powered painting system may encounter difficulty when the paint level is at or below the intake aperture(s) of the nozzle. When the paint level falls below such a level, air may be drawn into the powered painting system, which may produce air bubbles within the power painter's supply line that may cause splattering or other undesired effects during the paint application process. Because typical paint buckets have relatively large diameters relative to the size of the intake nozzle of a powered painting system, a substantial volume of paint may remain in a bucket when the paint level has been reduced to a problematic height. Using the final portion of paint within a bucket, such as the last pint of paint within a conventional five-gallon bucket, may be difficult. While the remaining paint may still be drawn into the nozzle of a power painting system by manually tilting the bucket to collect the paint at the resulting lower edge while the bucket is held at an incline, such a practice requires additional labor by the painter and further requires that the painter be extremely attentive to the level of paint remaining in a bucket. Of course, in some examples the paint remaining at the bottom of a bucket that cannot be readily extracted by a power painting nozzle may simply be discarded, which is both economically wasteful and environmentally undesirable.

The present invention provides funnel shaped bottoms for paint buckets and paint buckets with such funnel-shaped bottoms. The funnel shape may cause paint within the bucket to flow down the angled wall(s) of the funnel to a recess for uptake by the powered painting system. The recess may temporarily retain the intake nozzle of a power painter. By retaining the intake nozzle within the recess where the funnel-shaped bottom gathers the final portion of paint within the bucket, the extraction of the final portion of paint from within the bucket is simplified. The recess may have various geometries, such as cylindrical or conical, to facilitate the temporary retention of a power painter intake nozzle within the recess. The recess of the funnel shaped bottom may be dimensioned to receive an anticipated power painter nozzle and may be further dimensioned to permit the rod and/or hose attached to the nozzle to assume one or more desired orientations within the bucket.

The funnel shaped bottom of a paint bucket in accordance with the present invention may be formed as an integral part of a paint bucket or may be provided as an insert that may be used with a pre-existing paint bucket. If provided as an insert, a funnel shaped bottom in accordance with the present invention may use a paint-tight seal, such as a pliable flange of silicone or rubber, to firmly contact and seal with the interior sides of the bucket when the funnel-shaped bottom has been inserted into the interior of the bucket.

Similar to the above power painting systems, other containers and vessels also suffer from a similar design that makes the final portions of a material within a container difficult to withdraw using an extraction device. As the level of a material within a container or vessel lowers, an extraction device, such as a straw, tube, nozzle, or the like, may encounter difficulty when the material level is at or below the extraction device intake. Moreover, when the material level falls below such a level, air may be drawn into the extraction device, which may cause loss of suction, may produce air bubbles within the extraction device that may cause splattering or other undesired effects. As such, using the final portion of material within a container may be difficult. While the remaining material may still be drawn into the extraction device by manually tilting the container to collect the material at the resulting lower edge while the container is held at an incline, however such a practice may be undesirable or impracticable.

The present invention also provides funnel shaped bottoms for various types of containers and vessels with such funnel-shaped bottoms. As with the above, the funnel shape may cause a material within the container or vessel to flow down the angled wall(s) of the funnel to a recess for uptake by the tube, straw, or other type of intake. Moreover, the recess in some embodiments will temporality retain the intake. By retaining the intake within the recess where the funnel-shaped bottom gathers the final portion of the material within the container or vessel, the extraction of the final portion of material from within the container or vessel is simplified. The recess in various embodiments includes various geometries, such as cylindrical or conical, to facilitate the temporary retention of a tube, straw, or other type of intake within the recess. The recess of the funnel shaped bottom in some embodiments is dimensioned to receive an anticipated tube, straw, nozzle, or other type of intake and may be further dimensioned to permit intake to assume one or more desired orientations within the container or vessel.

The funnel bottom of a container or vessel in accordance with the present invention in various embodiments is formed as an integral part of a container or vessel or in other embodiments is provided as an insert that in some embodiments is capable of being used with a pre-existing container or vessel. If provided as an insert, a funnel shaped bottom in accordance with the present invention is in some embodiments use a seal, such as a pliable flange of silicone or rubber, to firmly contact and seal with the interior sides of the container or vessel when the funnel-shaped bottom has been inserted into the interior or the container or vessel.

A problem associated with other types of containers incorporating extracting devices such as tubes, straws, or other types of intakes, is that they do not typically contact the bottom surface and there will be a gap between the intake and the bottom of the container. This results in the final portions of the contents within the container being difficult to remove without the user either pouring, or tilting the container, such that the last remain contents may be utilized. The present invention solves this problem by holding the intake at an angle other than substantially vertical within a recess and allows an amount of pressure to be asserted by the intake on the bottom surface of the container so that the maximum amount of fluid is capable of being removed. In contrast with conventional systems, asserting pressure on an intake may result in the intake traveling away from the bottom portion of a container or vessel.

In another embodiment, the present invention provides a funnel bottom container or vessel that is capable of being utilized with a container of vessel top portion, such as a cap, lid, or the like. The top portion in various embodiments is sealable and in other embodiments is not sealable. Further, in some embodiments, the top portion is removably attached to the container or vessel by means of threads, or the like. In another embodiment, the top portion is not removable and is formed as part of the container or vessel. In some embodiments, the top portion is configured to retain a pump, siphon, or other extraction device.

Another object of the present invention is to provide a funnel bottom container or vessel wherein the container or vessel is capable of being formed from various types of materials. In some embodiments of the present invention, the container or vessel is a bucket, tube, cup, or the like. In some embodiments of the present invention, the instant invention is configured such that the shape of the container varies in shape and/or size.

While the forgoing references to power painting systems, containers, or vessels, it should be understood that other systems, containers, and vessels are used in various embodiments of the present invention and the term power painting system, container, or vessel, is not limiting to its context.

Additionally, the foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
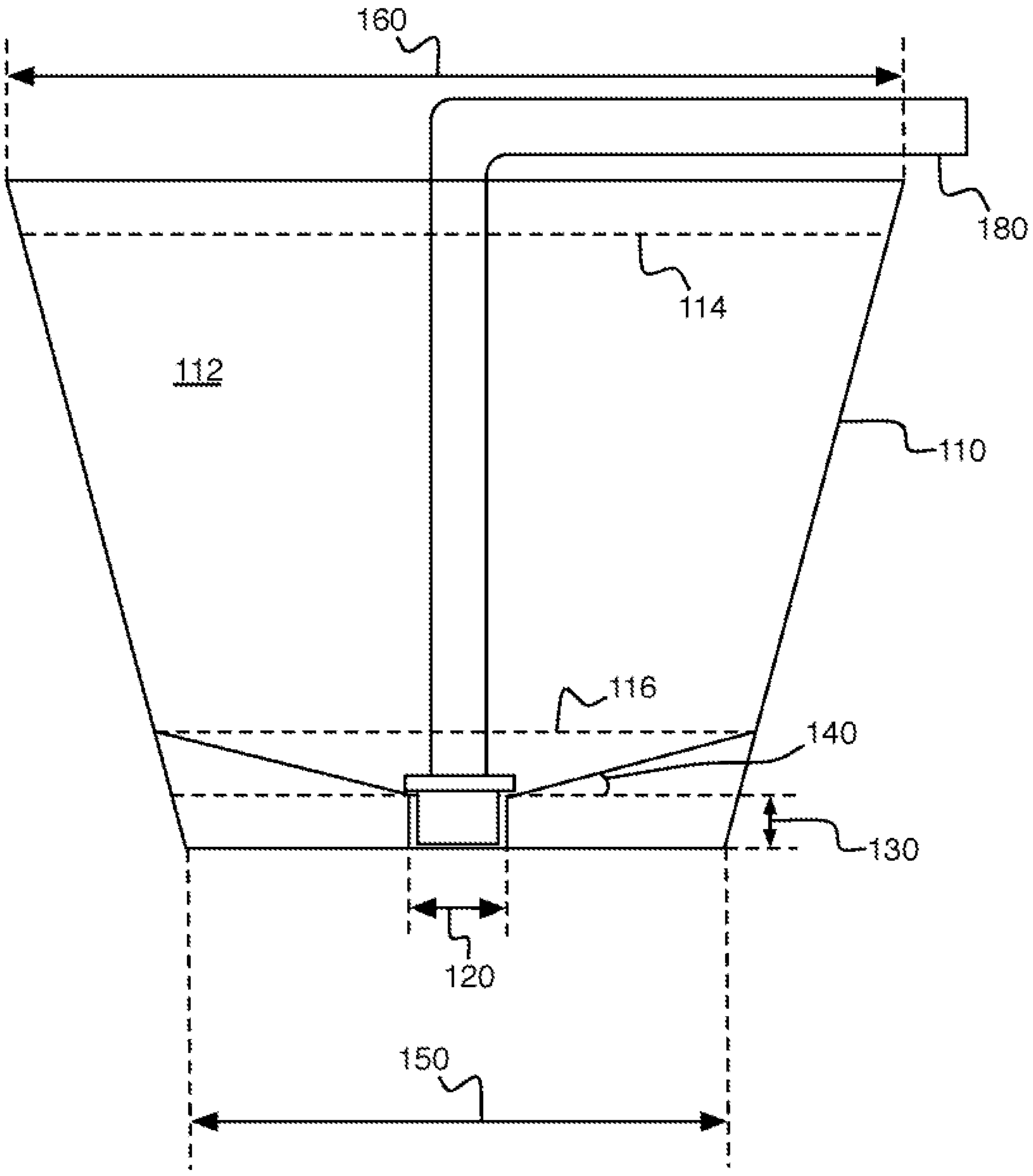
FIG. 1 illustrates a cross-section of an exemplary bucket in accordance with the present invention.

One example of a funnel-bottomed bucket in accordance with the present invention is illustrated in FIG. 1. A paint bucket 110 may comprise an interior 112 that holds a certain volume of paint, for example, a bucket may provide an interior that holds five gallons of paint or other liquid. However, bucket 110 may comprise any size or volume of bucket, whether designed specifically to hold paint or for general use. The bucket 110 may have a top diameter 160 and a bottom diameter 150. If the bucket walls are straight, the top diameter 160 and the bottom diameter 150 may be the same, while if the bucket 110 is flare sided the top diameter 160 may be greater than the bottom diameter 150. A bucket 110 may have a first paint level 114 when full but a second paint level 116 after most of the paint within bucket 110 is consumed by power painting system 180 (described further below). Of course, paint levels other than first paint level 114 and second paint level 116 will exist when buckets in accordance with the present invention are used, and the level may eventually be lower than exemplary second paint level 116, even to the point of being at a level within the recess provided at the bottom of the exemplary bucket 110, which shall be described further below.

Because a relatively small amount of paint may fill the recess containing the nozzle of a sprayer system 180, almost every bit of paint contained within bucket 110 may be used without having to reposition bucket 110 or the nozzle of power painting system 180. A recess, shown in the example of FIG. 1 as cylindrical, may have a diameter of 120 that corresponds to the diameter of a nozzle used by the power painting system 180 to extract paint from the bucket 110. The angled sides of the funnel bottom, which shall be described more fully below, may slope at an angle 140 to cause paint to flow into the recess as the level of paint within the bucket 110 lowers. The top of the recess may correspond with the bottommost edge of the angled side of the funnel bottom. The recess may have a height 130 sufficient to retain the nozzle of a power painting system 180 within the recess.

Figure 2:
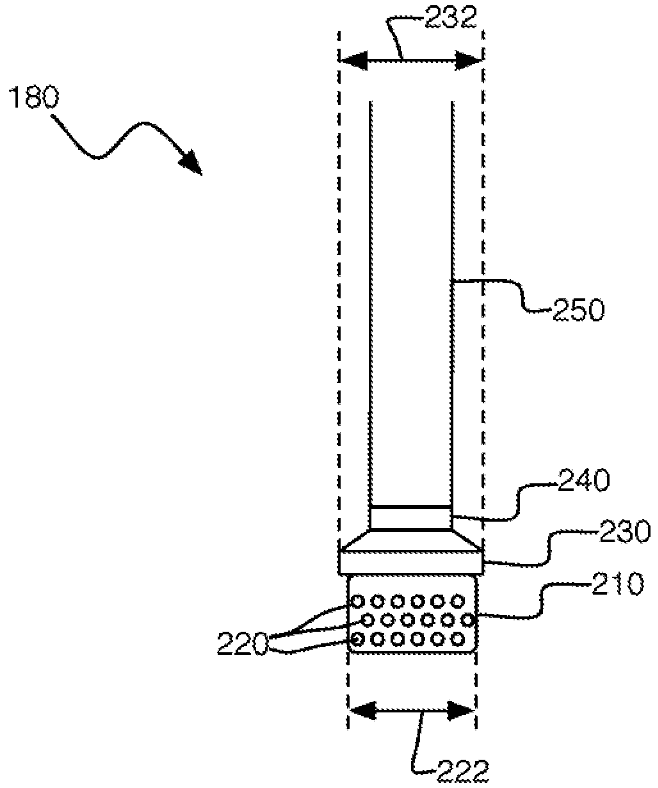
FIG. 2 illustrates an example of an intake nozzle that may be used in conjunction with a bucket in accordance with the present invention.

FIG. 2 illustrates one example of a power painting system 180 having a nozzle 210 that may be used in conjunction with buckets in accordance with the present invention. At least one aperture 220 within nozzle 210 may permit paint to be drawn into nozzle 210 for application by a painter. Screens and/or filters may be provided as part of or in conjunction with nozzle 210 to protect the painting system 180 from debris that may be contained in paint. A rigid pipe 250 may deliver paint to a hose that ultimately delivers paint to a sprayer, roller, or other paint application tool under the control of a powered pump system (not shown). The pipe 250 may be coupled to nozzle 210 using a coupling 240 that affixes pipe 250 to the head 230 of nozzle 210. Nozzle 210 may have a diameter of 222 that is smaller than the diameter 232 of head 230. Diameter 222 of nozzle may be the basis of selecting the diameter of a recess used in a funnel-bottomed bucket in accordance with the present invention.

Figure 3:
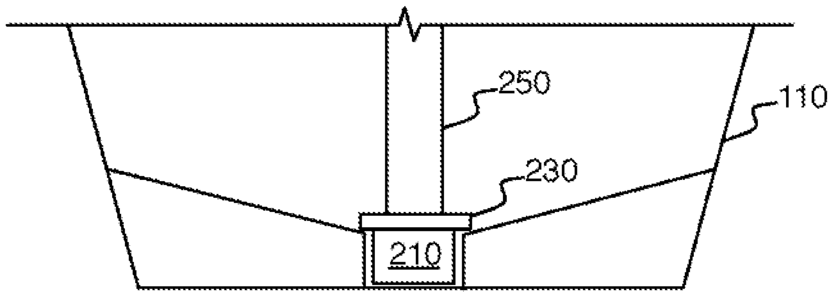
FIG. 3 illustrates an example of an intake nozzle in use with an exemplary bucket in accordance with the present invention.

FIG. 3 illustrates an example of a nozzle 210 inserted into a recess within a funnel-bottomed bucket 110. As can be seen in the example of FIG. 3, the diameter of nozzle 210 is slightly less than the diameter of the recess, permitting nozzle 210 to be snugly but removably inserted into the recess without blocking the flow of paint down the inclined walls of the funnel bottom and into the recess. In some examples, the diameter of the recess may be sufficiently larger than the diameter of nozzle 210 to permit nozzle 210 and pipe 250 to be oriented at an angle other than substantially vertical.

Figure 4A:
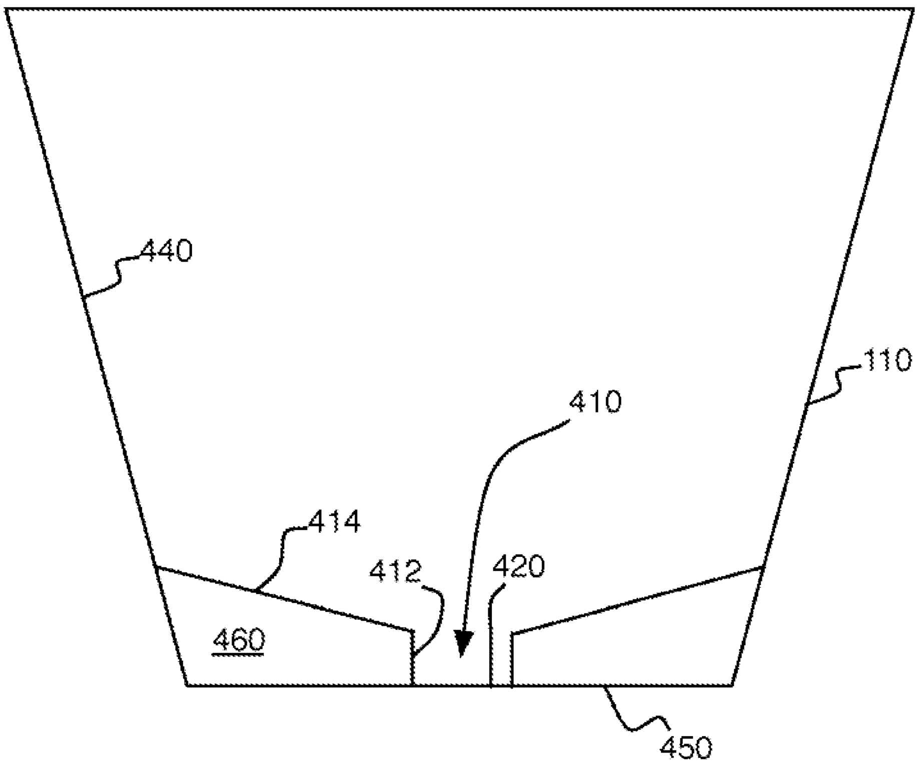
FIGS. 4A and 4B illustrates a further example of a bucket in accordance with the present invention.
Figure 4B:
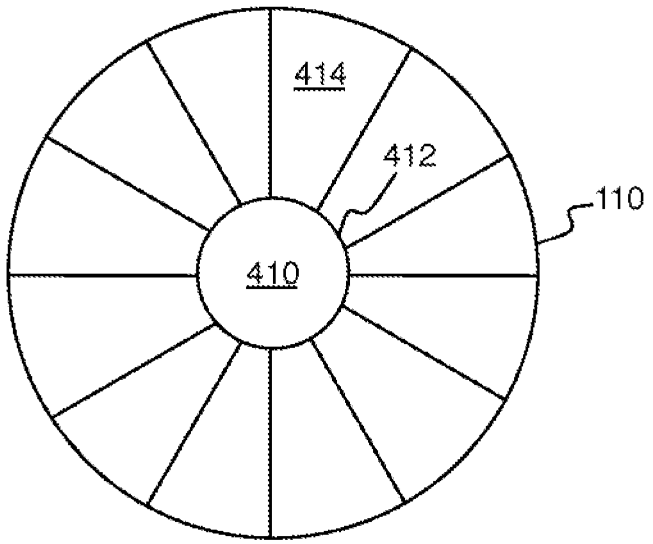

FIGS. 4A and 4B illustrate additional properties of an exemplary recess 410 within a bucket 110. Recess 410 may be defined by a sidewall 412 that extends circularly defining the perimeter of recess 410. Recess 410 may have a bottom 420, with bottom 420 corresponding to the lowest level to which paint within bucket 110 may flow when the bucket 110 is in an upright orientation. Recess 410 may have a cylindrical shape (as depicted in the example of FIG. 4A), a truncated conical shape (as depicted in the example of FIG. 6), or other geometric shapes.

An angled funnel wall 414 may define a funnel having a desired angle to cause paint within bucket 110 to flow into a recess, such as recess 410, as the paint level within bucket 110 reduces. Funnel wall 414 may be configured with an incline of a few degrees to several degrees relative to horizontal, such as between three and forty-five degrees or between five and thirty degrees. A space 460 beneath the angled funnel wall may be solid or hollow, but will not contain paint while the bucket 110 is in use. In some examples, funnel wall(s) and/or recesses may be created within a pre-existing bucket using an insert that may be engaged in the bottom of a bucket having a flat bottom.

Figure 5:
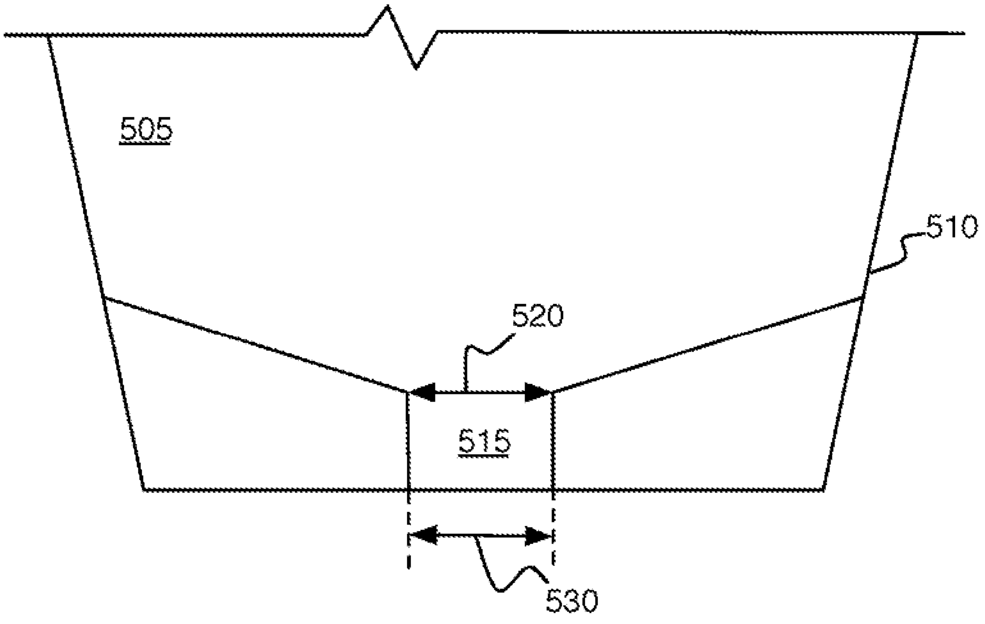
FIG. 5 illustrates a further example of a bucket in accordance with the present invention.

Referring now to FIG. 5, further aspects of an exemplary funnel-bottomed bucket 510 that may hold paint within its interior 505 in accordance with the present invention is illustrated. A recess 515 at the bottom of a funnel shape may be cylindrical in shape. By being cylindrical in shape, recess 515 may possess a top diameter 520 equal to its bottom diameter 530.

Figure 6:
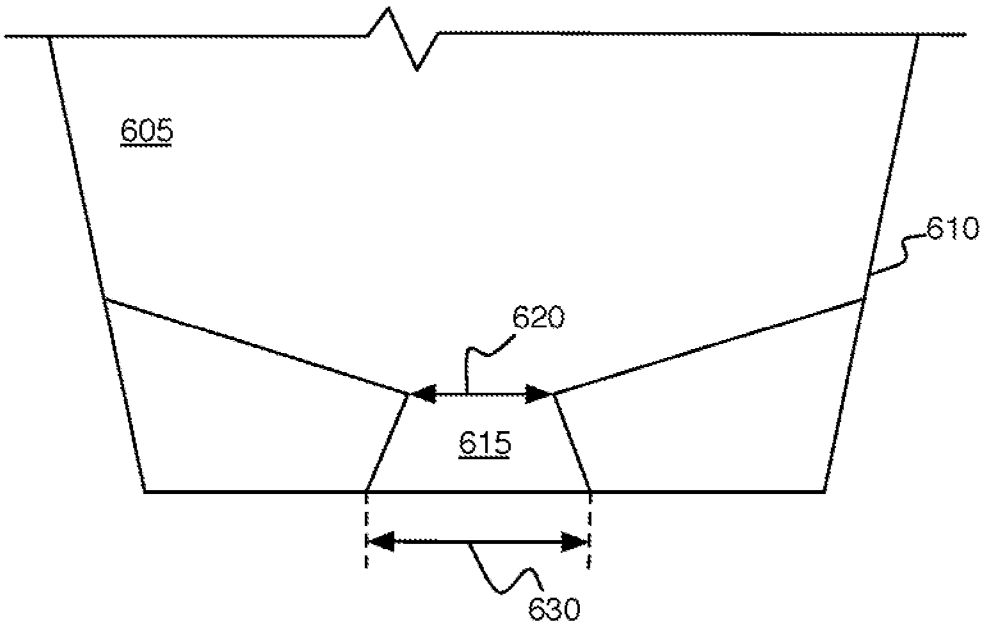
FIG. 6 illustrates a further example of a bucket in accordance with the present invention.

Meanwhile, FIG. 6 illustrates an example of a bucket 610 having an interior 605 to retain a volume of paint wherein the recess 615 has a partially conical shape, i.e. a truncated cone. Recess 615 has a conical shape in the sense that top diameter 620 is smaller than bottom diameter 630 of recess 615. In examples, top diameter 620 may be slightly greater than the anticipated diameter of an intake nozzle of a power painting system. By flaring out at the bottom, recess 615 may receive a nozzle inserted past the top of the recess 615 and permit the nozzle assembly to tilt or lean within recess 615 while the power painter is in use. By leaning the nozzle and pipe of a power painting system, the bucket and/or power painting system may be less likely to tip due to the pulls or tugs that may naturally occur during the painting process.

Figure 7:
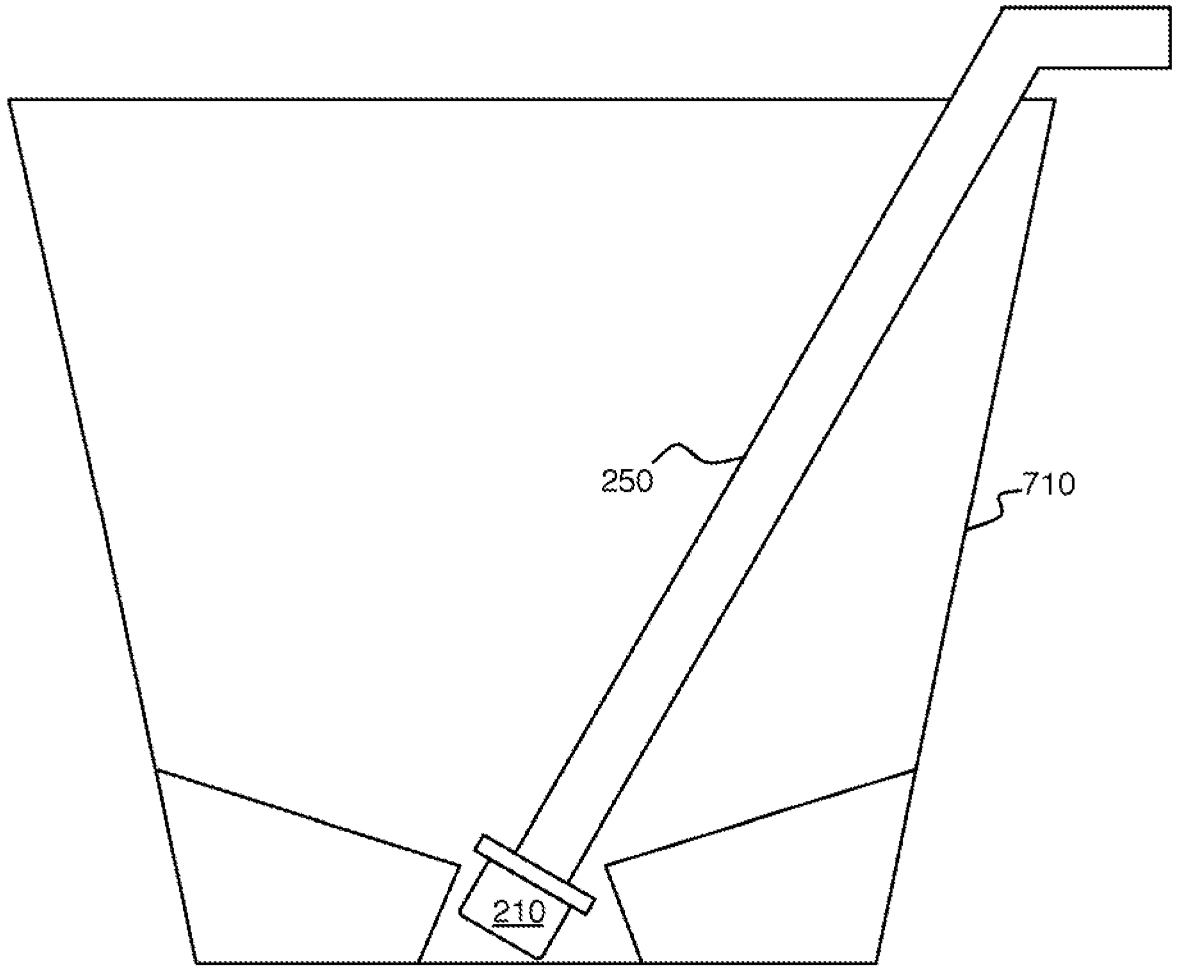
FIG. 7 illustrates a further example of an intake nozzle in use with a further exemplary bucket in accordance with the present invention.

FIG. 7 illustrates one example of a nozzle 210 inserted into a recess with the pipe 250 of the power painting system leaned against a sidewall of bucket 710. By selecting appropriate dimensions for a recess, a cylindrical recess may be sufficiently larger than the diameter of nozzle 210 to permit the power painting system to lean while nozzle 210 remains within recess. In other examples of a conically shaped recess, the upper diameter of the recess may hold a nozzle securely but removably while the wider diameter of the bottom of the recess may permit the nozzle to lean and, along with the nozzle, the pipe 250 and other components of the power painting system.

Figure 8:
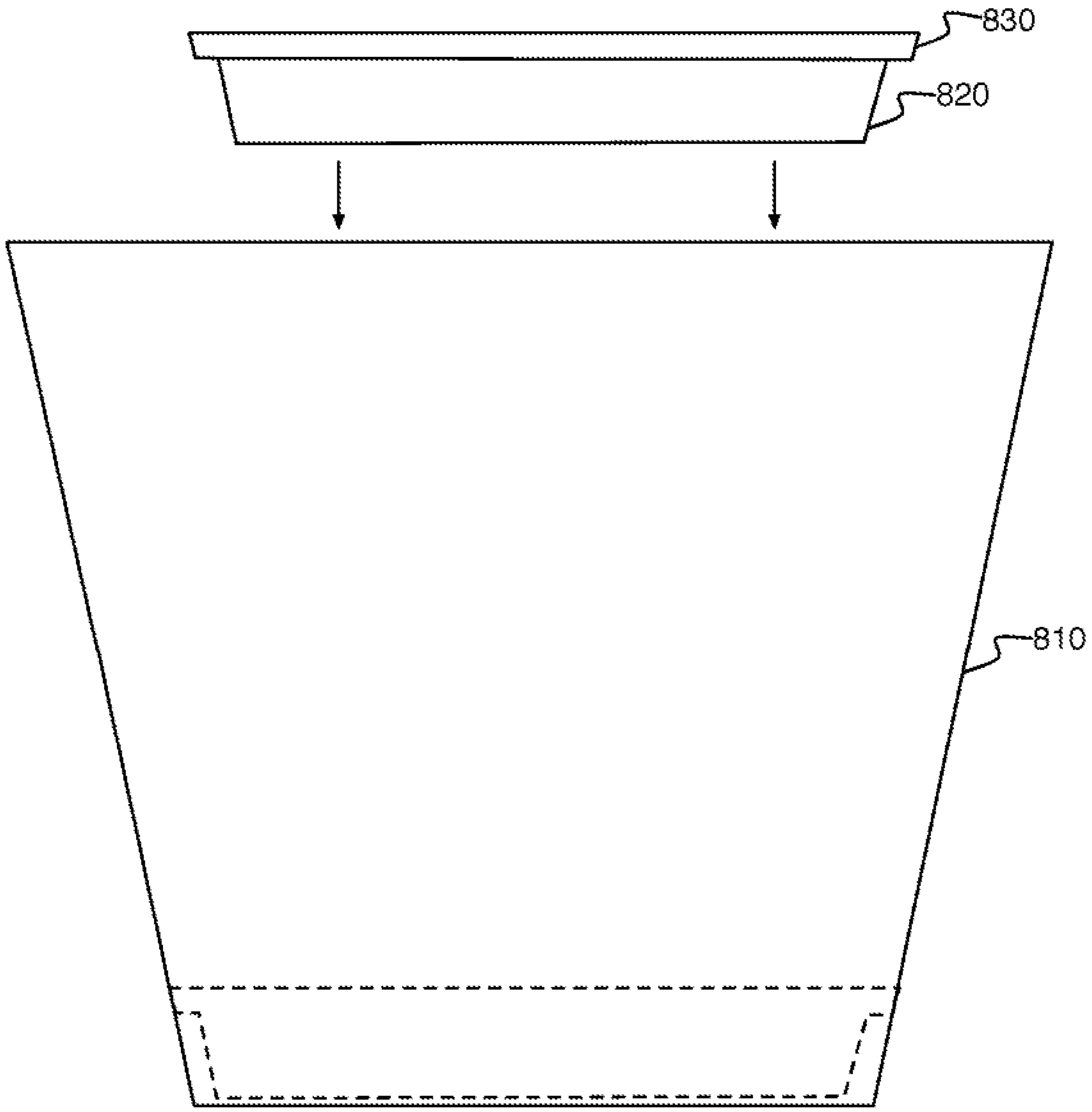
FIG. 8 illustrates an example of an insert that may be used to create an exemplary bucket in accordance with the present invention.

While funnel-bottomed paint buckets in accordance with the present invention may be constructed with a funnel portion integral to the bucket, in other examples a funnel-shaped bottom in accordance with the present invention may be inserted into pre-existing paint buckets (or other types of buckets) and, optionally, withdrawn and reused alter painting with that bucket has been concluded. For example, as depicted in FIG. 8 a bucket 810 may receive a funnel-shaped assembly 820 having a seal 830 around a perimeter edge of the funnel-shaped bottom 820 to create a tight seal between the interior walls of bucket 820 and the funnel-shaped bottom 820. A seal 830 may comprise a silicone or rubber flange, a gasket, or any other structure that firmly contacts the interior sidewall of a bucket to prevent paint from leaking between the funnel-shaped bottom 820 and the sidewall of the bucket 810. In some examples, a seal 830 may be omitted entirely As shown in phantom, in manners similar to those described above, a funnel-shaped insertable bottom 820 may provide a recess and angled funnel sidewalls that direct paint to the recess when the funnel-shaped bottom 820 is installed within a bucket 810.

Systems and methods in accordance the present invention are not limited to any particular size or type of bucket or other paint container, nor are they limited to any given type of power painting system or nozzle assembly. Exemplary diameters for a top and/or bottom of a recess within a funnel bottom in accordance with the present invention may range from about 0.1.5 inches and 2.5 inches, although other dimensions may be used. In many examples, a power painter nozzle may have standardized dimensions and a funnel bottom for a paint bucket in accordance with the present invention may provide a recess having dimensions adapted to receive and retain standardized nozzles. In other examples, nozzles and recesses may be formed to more effectively mate during use. In some examples, polygon shaped recesses rather than circular recesses may be used, particularly if a polygon shaped nozzle is used. Further, the angle of the funnel wall may vary. The viscosity of different types of paint may differ and, accordingly, the angle of the funnel walls of a bottom in accordance with the present invention may be selected in order to encourage a wide range of viscosities of paint to flow into a provided recess for uptake by a power painter nozzle.

Whether formed as discrete funnel bottom for insertion into pre-existing paint buckets or formed as an integral paint bucket having a funnel-shaped bottom, the present invention may be formed using various types of materials using various fabrication techniques. In many examples, a plastic may be injection molded to form a bucket and/or funnel bottom for a bucket. In other examples, metals, nylons, resins, and other materials may be used to form systems in accordance with the present invention through molding, casting, machining, or any other technique.

In some embodiments of the present invention, the extraction device is, but not limited to, a pump assembly, a spray assembly, a fluid dispensing device, a trigger-spraying system. In some embodiments of the present invention, the extraction device is fixedly attached to the container or vessel. In other embodiments, the extraction device is formed as part of the container or vessel. In some embodiments, the extraction device is fixedly attached to a top portion of the container or vessel. In other embodiments, the extraction device is not part of the container, vessel, or top portion. In some embodiments of the present invention, the extraction device is configured to include a straw, tube, nozzle, or the like.

Systems and methods in accordance with the present invention are not limited to any particular size or type of painting system, container, or vessel, nor are they limited to any given type of power painting system, nozzle assembly, or extraction device. The contents, material, or substance held within an interior area of the container or vessel with respect to systems and methods in accordance with the present invention, are not limited to any particular contents, material, paint, substance, or any other material.

Various embodiments of the inventive concept include, but are not limited to spray and/or pump bottles/containers for holding a liquid, including those used in connection with cleaning products, herbicide and/or insecticide products, paint, perfume, cosmetics, healthcare, food/beverage/cooking/baking (e.g. non-stick cooking sprays, vermouth misters), and/or air fresheners.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A container, the container comprising:

an interior area that may contain a volume of a material;

a funnel bottom;

an extraction system, wherein the extraction system further comprises an intake;

a recess at the bottom of the container interior, wherein the recess receives the intake of the extraction system;

wherein the funnel bottom further comprises a sloping wall that directs the material towards the recess as a level of material within the container lowers due to material being withdrawn by the intake; and wherein the recess comprises:

a truncated conical shape;

a recess height;

a top diameter; and a bottom diameter, wherein the recess top diameter is less than the recess bottom diameter.

2. The container of claim 1, wherein the recess height is configured to detachably retain the intake.

3. The container of claim 1, wherein the recess bottom diameter is sufficiently larger than the intake diameter to permit the intake to be oriented at an angle other than substantially vertical.

4. The container of claim 1, wherein the recess permits a detachably retained intake to tilt within the recess.

5. The container of claim 1, wherein the recess permits a limited amount of travel for the detachably retained intake to move in a direction substantially horizontal and away from the recess.

6. A container system, the container system comprising:

a funnel-bottomed container, wherein the funnel-bottomed container further comprises a top diameter and a bottom diameter;

an interior that may contain a volume of a material;

an extraction system, the extraction system further comprising an intake nozzle;

a recess at the bottom of the interior, the recess receiving the intake nozzle of the extraction system, wherein the recess further comprises a truncated conical shape such that a recess top diameter is less than a recess bottom diameter, wherein the recess further comprises a recess height configured to detachably retain the intake nozzle, and wherein an intake nozzle diameter is less than the recess top diameter; and a funnel bottom with sloping wall that cause material to flow into the recess as a level of material within the container lowers due to material begin withdrawn by the intake nozzle.

7. The container system of claim 6, wherein the recess comprises a truncated cone recess that detachably retains the intake nozzle, and wherein the recess bottom diameter is sufficiently larger than the intake nozzle diameter to permit the intake nozzle to be oriented at an angle other than substantially vertical.

8. The container system of claim 7, wherein the truncated cone recess permits a detachably retained intake nozzle to tilt within the recess.

9. The container system of claim 8, further comprising an insertable bottom, the insertable bottom containing the recess and the funnel bottom, the insertable bottom being insertable into and removable from the interior of the container.

10. The container system of claim 9, wherein the insertable bottom further comprises a seal that prevents material from the interior of the container from passing below the inserted insertable bottom.

11. An insertable bottom system for a container, the insertable bottom system comprising:

an extraction system, the extraction system further comprising an intake nozzle;

a recess, wherein the recess further comprises:

a truncated conical shape such that a recess top diameter is less than a recess bottom diameter, wherein the recess being configured to receive the intake nozzle of the extraction system;

a recess height being configured to detachably retain the intake nozzle of the extraction system; and an intake nozzle diameter less than the recess top diameter; and angled funnel walls that slope at an angle toward the recess, and wherein the insertable bottom may be detachably inserted into a flat bottomed container to direct material within the interior of the container into the recess of the insertable bottom as material is withdrawn from the interior of the container by the intake nozzle of the extraction system.

12. The insertable bottom system for a container of claim 11, further comprising a seal that prevents material from leaking below the insertable bottom when it is inserted into a flat bottomed container.

13. The insertable bottom system for a container of claim 12, wherein the recess permits the intake nozzle to tilt while material is withdrawn from the interior of the container.

* * * * *